United States Patent
Su et al.

(10) Patent No.: US 9,407,308 B1
(45) Date of Patent: Aug. 2, 2016

(54) INTER RADIO ACCESS TECHNOLOGY MEASUREMENT WITH MULTIPLE RECEIVERS

(71) Applicant: QUALCOMM Incorporated, San Diego, CA (US)

(72) Inventors: Jin-Sheng Su, San Diego, CA (US); Yu Fu, San Diego, CA (US); Tom Chin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/593,824

(22) Filed: Jan. 9, 2015

(51) Int. Cl.
    *H04B 1/04* (2006.01)
    *H04B 1/3816* (2015.01)
    *H04W 24/10* (2009.01)

(52) U.S. Cl.
    CPC ............. *H04B 1/3816* (2013.01); *H04W 24/10* (2013.01)

(58) Field of Classification Search
    CPC . H04B 1/3816; H04W 24/10; H04W 36/0066
    USPC ............. 455/73, 550.1, 552.1, 558, 130, 132, 455/168.1; 370/314, 321, 337, 347, 458
    See application file for complete search history.

(56) References Cited

U.S. PATENT DOCUMENTS

| 7,535,846 | B2 | 5/2009 | Kim et al. |
| 8,805,375 | B2 | 8/2014 | Periyalwar et al. |
| 2014/0036710 | A1 | 2/2014 | Chin et al. |
| 2014/0248922 | A1 | 9/2014 | Josso et al. |
| 2015/0312807 | A1* | 10/2015 | Nie .................. H04W 36/0083 455/436 |

FOREIGN PATENT DOCUMENTS

| WO | 2011109750 A1 | 9/2011 |
| WO | 2014070066 A1 | 5/2014 |

OTHER PUBLICATIONS

International Search Report and Written Opinion—PCT/US2015/067208 ISA/EPO—Mar. 23, 2016.

* cited by examiner

*Primary Examiner* — Tuan Pham
(74) *Attorney, Agent, or Firm* — Seyfarth Shaw LLP

(57) ABSTRACT

A user equipment (UE) with multiple receive chains and one or more subscriber identity modules improves radio access technology (RAT) measurements when one or more of the subscriber identity modules are active and valid measurement gaps or consecutive idle time slots are unavailable for the radio access technology measurements. The UE communicates with a first receive (RX) chain for a first subscriber identity module (SIM). The UE also performs the radio access technology (RAT) measurement with a second receive (RX) chain while maintaining communications with the first receive chain.

20 Claims, 7 Drawing Sheets

INTER RADIO ACCESS TECHNOLOGY MEASUREMENT WITH MULTIPLE RECEIVERS

BACKGROUND

1. Field

Aspects of the present disclosure relate generally to wireless communication systems, and more particularly, to radio access technology measurement with multiple receivers.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the universal mobile telecommunications system (UMTS), a third generation (3G) mobile phone technology supported by the 3rd Generation Partnership Project (3GPP). The UMTS, which is the successor to global system for mobile communications (GSM) technologies, currently supports various air interface standards, such as wideband-code division multiple access (W-CDMA), time division-code division multiple access (TD-CDMA), and time division-synchronous code division multiple access (TD-SCDMA). For example, China is pursuing TD-SCDMA as the underlying air interface in the UTRAN architecture with its existing GSM infrastructure as the core network. The UMTS also supports enhanced 3G data communications protocols, such as high speed packet access (HSPA), which provides higher data transfer speeds and capacity to associated UMTS networks. HSPA is a collection of two mobile telephony protocols, high speed downlink packet access (HSDPA) and high speed uplink packet access (HSUPA) that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes communicating with a first receive (RX) chain for a first subscriber identity module (SIM). The method also includes performing radio access technology (RAT) measurement with a second receive (RX) chain while maintaining communications with the first receive chain.

According to another aspect of the present disclosure, an apparatus for wireless communication includes means for communicating with a first receive (RX) chain for a first subscriber identity module (SIM). The apparatus may also include means for performing radio access technology (RAT) measurement with a second receive (RX) chain while maintaining communications with the first receive chain.

Another aspect discloses an apparatus for wireless communication and includes a memory and at least one processor coupled to the memory. The processor(s) is configured to communicate with a first receive (RX) chain for a first subscriber identity module (SIM). The processor(s) is also configured to perform radio access technology (RAT) measurement with a second receive (RX) chain while maintaining communications with the first receive chain.

Yet another aspect discloses a computer program product for wireless communications in a wireless network having a non-transitory computer-readable medium. The computer readable medium has non-transitory program code recorded thereon which, when executed by the processor(s), causes the processor(s) to communicate with a first receive (RX) chain for a first subscriber identity module (SIM). The program code also causes the processor(s) to perform radio access technology (RAT) measurement with a second receive (RX) chain while maintaining communications with the first receive chain.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
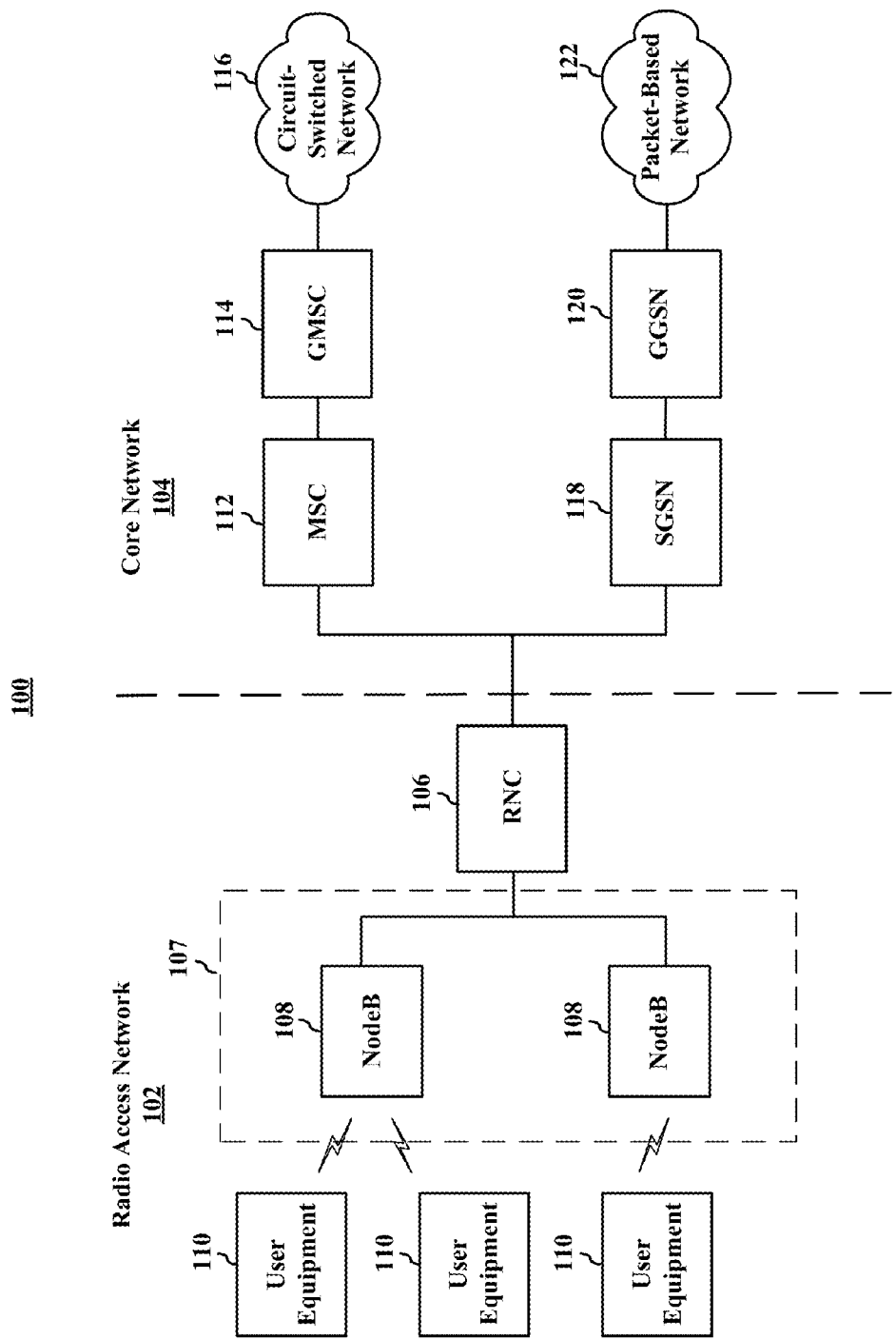
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of radio network subsystems (RNSs) such as an RNS 107, each controlled by a radio network controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. General packet radio service (GPRS) is designed to provide packet-data services at speeds higher than those available with standard GSM circuit switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit switched domain.

The UMTS air interface is a spread spectrum direct-sequence code division multiple access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
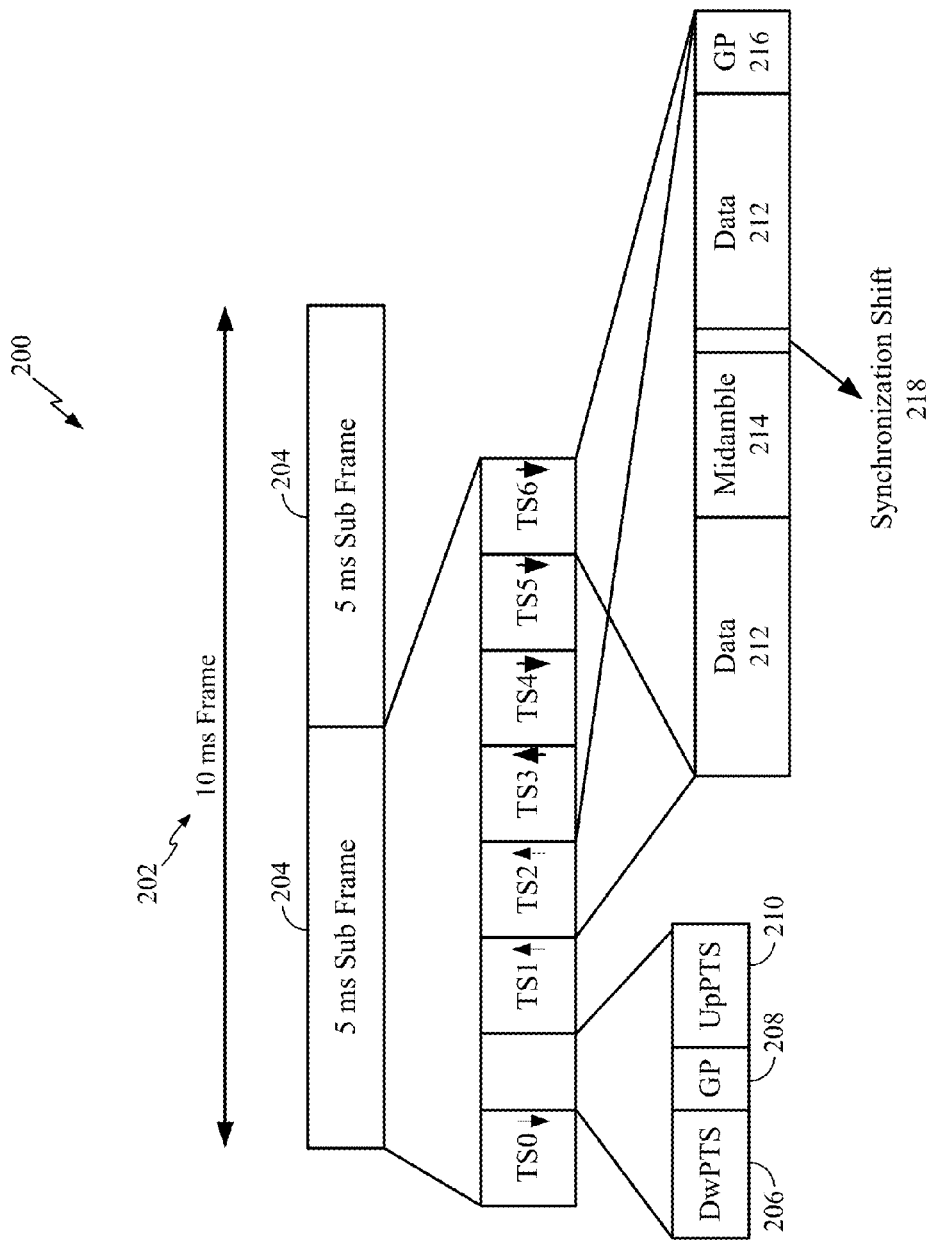
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including synchronization shift (SS) bits 218. Synchronization shift bits 218 only appear in the second part of the data portion. The synchronization shift bits 218 immediately following the midamble can indicate three cases: decrease shift, increase shift, or do nothing in the upload transmit timing. The positions of the synchronization shift bits 218 are not generally used during uplink communications.

Figure 3:
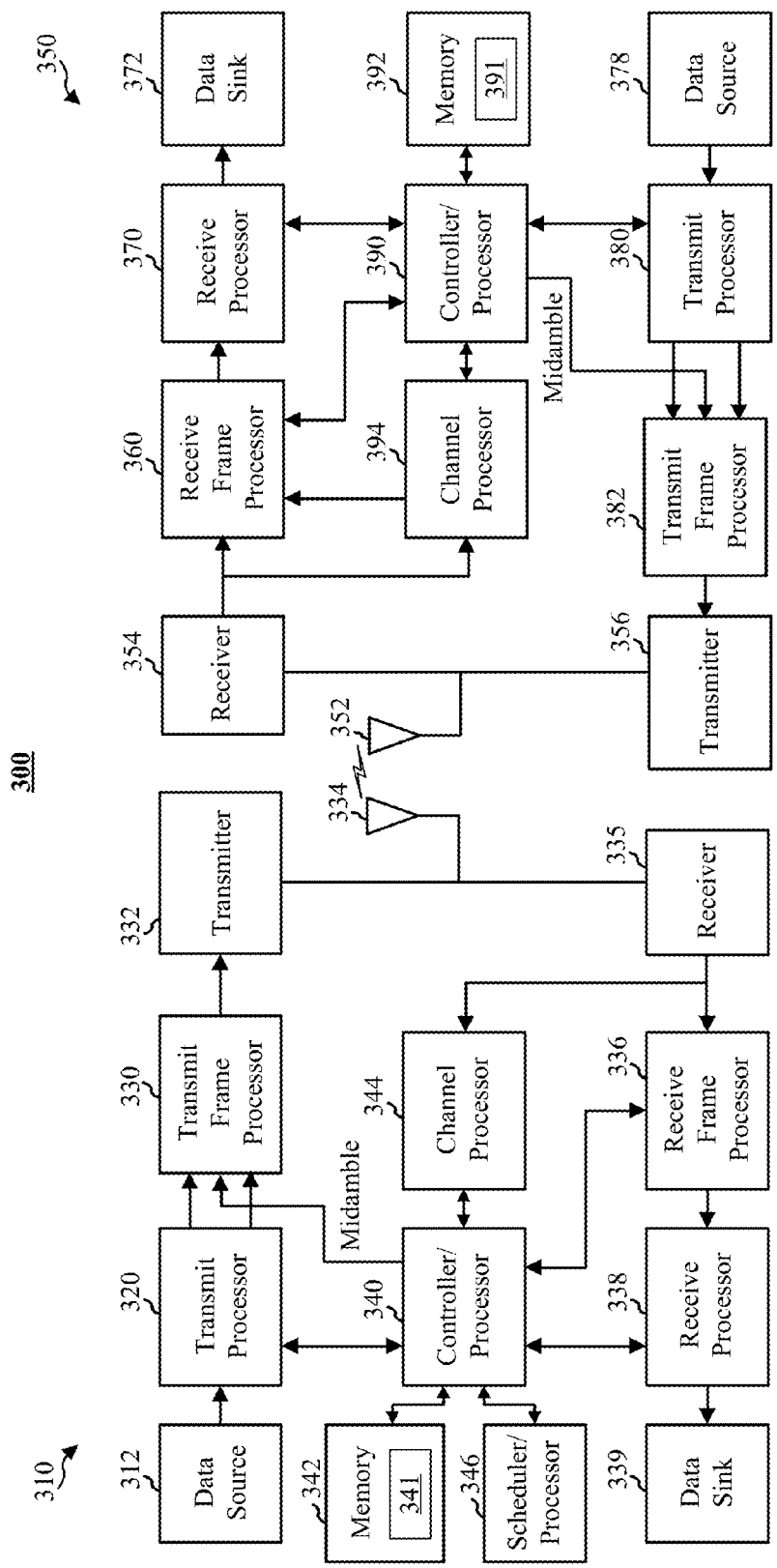
FIG. 3 is a block diagram conceptually illustrating an example of a node B in communication with a user equipment (UE) in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the node B 310 and the UE 350, respectively. For example, the memory 392 of the UE 350 may store a radio access technology measurement module 391 which, when executed by the controller/processor 390, configures the UE 350 for the latency reduction implementation according to aspects of the present disclosure. A scheduler/processor 346 at the node B 310 may be used to allocate resources to the UEs and schedule downlink and/or uplink transmissions for the UEs. For example, the memory 342 of the node B 310 may store a redirection module 341 which, when executed by the controller/processor 340, configures the node B 340 for circuit switched fall back redirection across mobile switching center pools.

Figure 4:
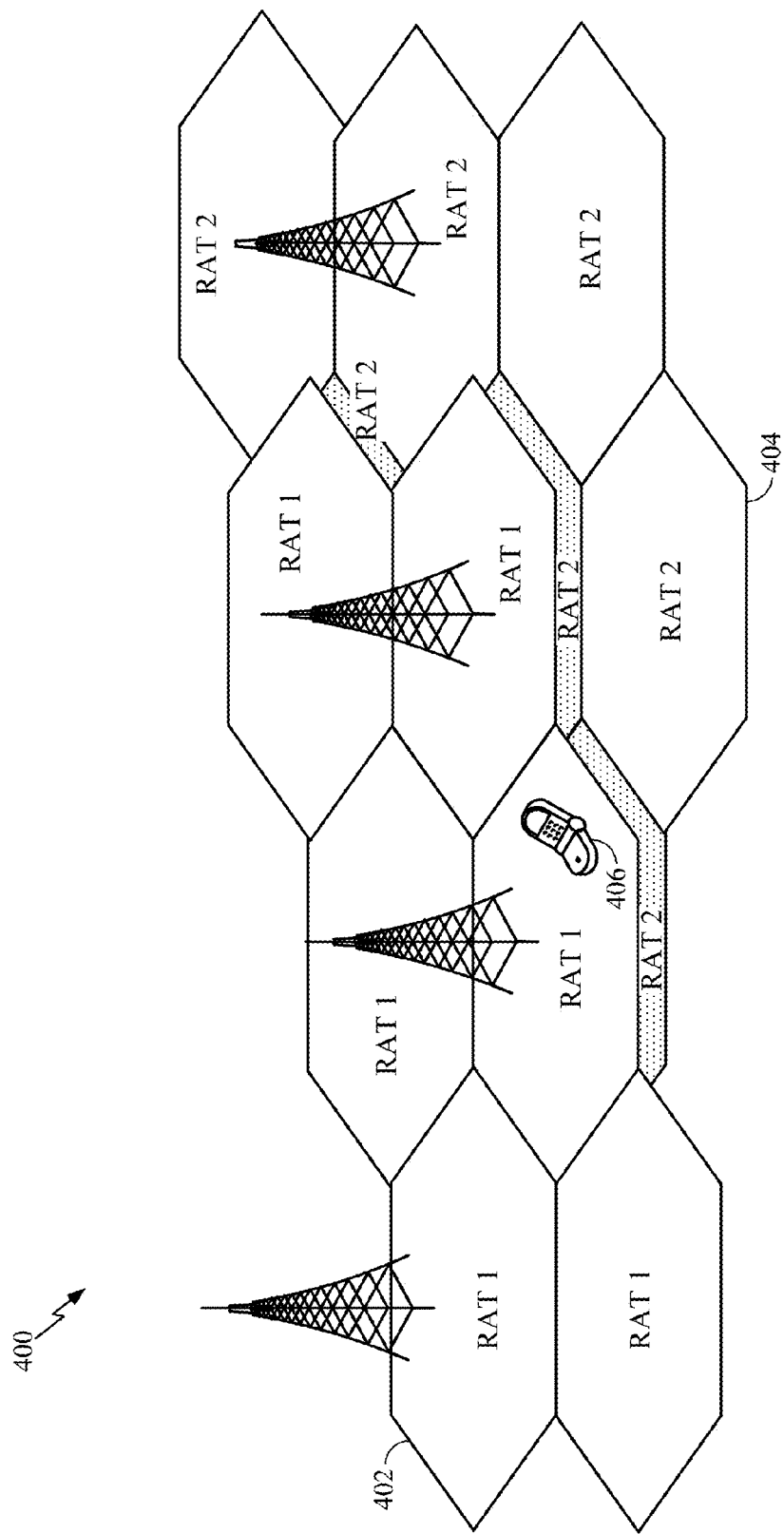
FIG. 4 illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4 illustrates coverage of an established network utilizing a first type of radio access technology (RAT-1), such as GSM, TD-SCDMA or long term evolution (LTE) and also illustrates a newly deployed network utilizing a second type of radio access technology (RAT-2), such as a GSM, TD-SCDMA or long term evolution (LTE).

The geographical area 400 may include RAT-1 cells 402 and RAT-2 cells 404. In one example, the RAT-1 cells are TD-SCDMA/GSM cells and the RAT-2 cells are LTE cells. However, those skilled in the art will appreciate that other types of radio access technologies may be utilized within the cells. A user equipment (UE) 406 may move from one cell, such as a RAT-1 cell 404, to another cell, such as a RAT-2 cell 402. The movement of the UE 406 may specify a handover or a cell reselection.

The handover or cell reselection may be performed when the UE moves from a coverage area of a TD-SCDMA cell to the coverage area of an LTE cell, or vice versa. A handover or cell reselection may also be performed when there is a coverage hole or lack of coverage in the TD-SCDMA network or when there is traffic balancing between the TD-SCDMA and LTE networks. As part of that handover or cell reselection process, while in a connected mode with a first system (e.g., TD-SCDMA), a UE may be specified to perform activities related to a neighboring cell (such as LTE cell). For example, the UE may measure the neighbor cells of a second network for signal quality, frequency channel, and base station identification. The UE may then connect to the strongest cell of the second network. Such measurement may be referred to as inter radio access technology (IRAT) measurement.

It is to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc. Signal quality is intended to cover the term signal strength, as well.

The UE may send a serving cell a measurement report indicating results of the IRAT measurement performed by the UE. The serving cell may then trigger a handover of the UE to a new cell in the other RAT based on the measurement report. The triggering may be based on a comparison between measurements of the different RATs. For example, the measurement may include a TD-SCDMA serving cell signal strength, such as a received signal code power (RSCP) for a pilot channel (e.g., primary common control physical channel (P-CCPCH)). The signal strength is compared to a serving system threshold. The serving system threshold can be indicated to the UE through dedicated radio resource control (RRC) signaling from the network. The measurement may also include a neighbor cell received signal strength indicator (RSSI). The neighbor cell signal strength can be compared with a neighbor system threshold. Before handover or cell reselection, in addition to the measurement processes, the base station identity (e.g., BSICs) may be confirmed and re-confirmed.

During wireless communications some time slots are allocated for data communications. The other time slots (e.g., the unallocated time slots) are referred to as idle time slots. For example, in TD-SCDMA systems, if a global system for mobile (GSM) communications measurement is desired, the serving RAT (i.e., TD-SCDMA) finds multiple consecutive idle time slots (e.g., at least two) in a subframe.

During the idle time slots, the UE can tune to another system/frequency to perform the measurements, such as GSM IRAT measurements. In some instances, however, consecutive time slots may be unavailable for the measurements. The unavailability of large measurement gaps or consecutive idle time slots in a RAT (e.g., TD-SCDMA) makes it challenging to perform IRAT measurements, especially for multi time slot packet switched (PS) calls or high data rate communications. For example, in high data rate communications, when there are insufficient idle time slots, the serving RAT stops downlink (DL) and/or uplink (UL) transmission/reception to create idle time slots for the TD-SCDMA to GSM IRAT measurements. Stopping the uplink and/or downlink transmission/reception causes data throughput loss. Thus, the unavailability of consecutive idle time slots in TD-SCDMA systems may cause a delay in IRAT measurements. This delay in IRAT measurements may result in dropped calls and/or degraded IRAT handover performance.

To trigger TD-SCDMA to GSM handover, the signal quality measurements, for example, are scheduled every subframe. Each TD-SCDMA subframe includes seven time slots. If there are insufficient consecutive idle time slots (e.g., less than three consecutive idle time slots), as many as twelve TD-SCDMA time slots may be used for BSIC verification and to trigger handover event evaluation. This may result in data loss as high as fifteen percent caused by the stoppage of the uplink and/or downlink transmission/reception.

The measurement gap for IRAT measurement of a cell (e.g., IRAT measurement of signal quality of an LTE cell) may be configured by the network. The periodicity of the measurement gap, however, may be undesirable causing the UE to unsuccessfully attempt to locate valid measurement gaps. For example, a periodicity of the measurement gap may be too long (e.g., 640 ms). When the periodicity of the measurement gap is too long and the signal quality of the serving cell is low (e.g., below a predefined threshold), the delay between IRAT measurements may result in a call drop if the serving RAT cannot find a valid measurement gap for a target cell (e.g., LTE) measurements or consecutive idle time slots for GSM cell measurement. The LTE RAT, the GSM RAT and the TD-SCDMA RAT may be supported by the UE for multimode communication.

The UE may include more than one subscriber identity module (SIM) or universal subscriber identity module (USIM). Each SIM may include a unique international mobile subscriber identity (IMSI) and service subscription information. Each SIM may be configured to operate in particular radio access technologies (e.g., LTE/TD-SCDMA/GSM/WCDMA). Each subscriber identity module may be associated with a same or different service provider or operator. Moreover, each subscriber identity module may have full phone features and may be associated with a unique phone number. Therefore, the UE may use each subscriber identity module to send and receive phone calls. That is, the UE may simultaneously communicate via the phone numbers associated with each individual subscriber identity module.

Multiple antennas and/or receivers/transmitters may be provided to facilitate multimode communication with various combinations of antenna and receiver/transmitter configurations. Each radio technology may transmit or receive signals via one or more antennas. For example, in some modem systems, there are two receivers for active radio access technologies.

Figure 5:
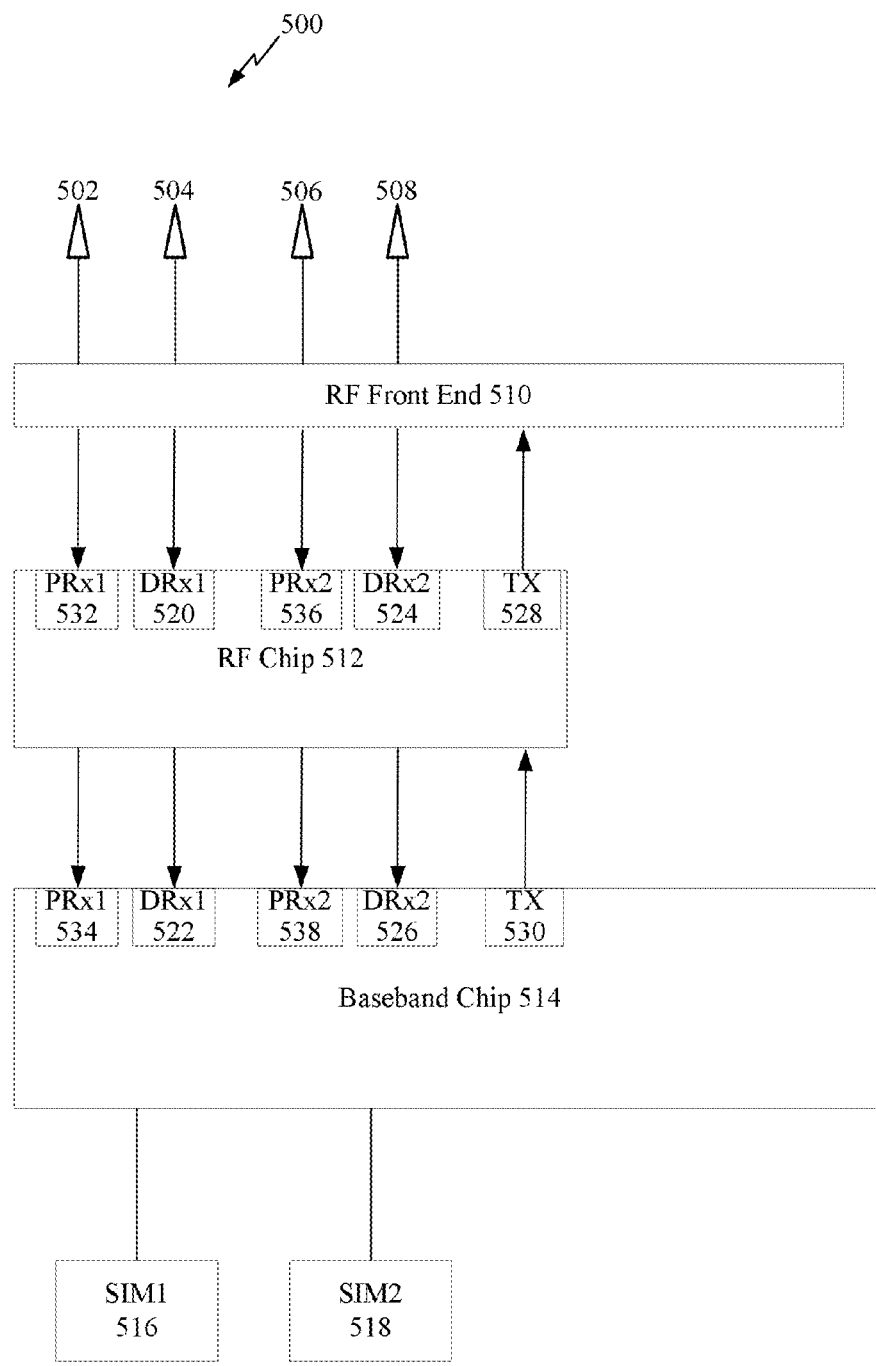
FIG. 5 illustrates radio frequency device mapping for multiple subscriber identity module (SIM) devices with multiple receivers according to one aspect of the present disclosure.

FIG. 5 illustrates radio frequency device mapping for multiple subscriber identity module (SIM) devices with multiple receivers. An example of the multiple subscriber identity module (SIM) device is a user equipment (UE). For illustrative purposes, FIG. 5 includes a dual SIM device 500. The dual SIM device 500 includes antennas 502, 504, 506, 508, a radio frequency front end 510, a first chip 512 (e.g., radio frequency chip), a second chip 514 (e.g., baseband chip) a first subscriber identity module 516 and a second subscriber identity module 518. The baseband chip 514 is coupled to the subscriber identity modules 516 and 518 and the radio frequency chip 512.

The radio frequency chip 512 receives wireless radio frequency signals from one or more antennas 502, 504, 506, 508 via the radio frequency front end 510, and converts the received signals to baseband signals to be processed by the baseband chip 514. The radio frequency chip 512 may also receive baseband signals from the baseband chip 514 and convert the received signals to wireless radio frequency signals to be transmitted via the radio frequency front end 510 and the one or more antennas 502, 504, 506, 508. Transmission of the frequency signals may be accomplished via a transmission path. The transmission path may include one or more of the antennas 502, 504, 506, 508 coupled to a transmitter 528 of the radio frequency chip 512 and coupled to a transmitter 530 of the baseband chip 514.

The baseband chip 514 further controls the operation of the subscriber identity modules 516 and 518 that are coupled to the baseband chip 514. The baseband chip 514 reads data from the subscriber identity modules 516 and 518 and writes data to the subscriber identity modules 516 and 518.

The dual SIM device 500, equipped with more than one subscriber identity module 516 and 518, may simultaneously access more than one core network, of the same or different radio access technologies such as global system for mobile communications (GSM), long term evolution, 1× radio transmission technology (1×)), global navigation satellite system (GNSS), evolution data optimized (EV-DO) or any other cellular technology, wideband code division multiple access (WCDMA), and time division-synchronous code division multiple access (TD-SCDMA). The dual SIM device 500 may make a voice or data call through one of the RATs using either of the subscriber identity modules 516 and 518. Moreover, the dual SIM device 500 may receive a phone call with either subscriber identity module 516 and 518 from a calling party.

The dual SIM device 500 may support multiple receive chains. For example, the dual SIM device 500 may support a first receive chain and a second receive chain. The first receive chain and the second receive chain enable communication with the subscriber identity modules 516 and 518, respectively. Each of the first receive chain and the second receive chain may include a primary receiver path and a diversity receiver path. The primary receive path of the first receive chain includes a primary antenna 502 coupled to a primary receiver (PRx1) 532 of the radio frequency chip 512 and coupled to a primary receiver (PRx1) 534 of the baseband chip 514. Similarly, the primary receive path of the second receive chain may include a primary antenna 506 coupled to a primary receiver (PRx2) 536 of the radio frequency chip and coupled to a primary receiver (PRx2) 538 of the baseband chip 514.

The diversity receive path of the first receive chain may include a diversity antenna 504 coupled to a diversity receiver (DRx1) 520 of the radio frequency chip 512 and coupled to a diversity receiver (DRx1) 522 of the baseband chip 514. Similarly, the diversity receive path of the second receive chain may include a diversity antenna 508 coupled to a diversity receiver (DRx2) 524 of the radio frequency chip 512 and coupled to a diversity receiver (DRx2) 526 of the baseband chip 514.

In one example implementation, TD-SCDMA/LTE/ WCDMA/1×/GNSS/EV-DO are associated with the first SIM card (SIM1) and use the first receive chain including the primary receivers 532 and 534, and the diversity receivers 520 and 522. A first GSM subscription (GSM1) is also associated with the first SIM card (SIM1) and is assigned to the first receive chain including the primary receivers 532 and 534. The second SIM card (SIM2) is associated with a second GSM subscription (GSM2), which uses the second receive chain including the separate primary receivers 536 and 538. In the dual SIM device 500 each subscription (i.e., each of the first subscriber identity module 516 and the second subscriber identity module 518) is supported by at least one transmitter and at least one receiver. For example, the first receive chain including the primary receivers 532 and 534 and the diversity receivers 520 and 522 support several of the RATs of the first subscriber identity module 516. The second receive chain including the primary receivers 536 and 538 supports the second subscriber identity module 518.

In a particular implementation, the first subscriber identity module 516 is configured to communicate according to a first RAT (e.g., TD-SCDMA) and according to a second RAT (e.g., a first GSM RAT (GSM1)). The second subscriber identity module 518 is configured to communicate according to a third RAT (e.g., a second GSM RAT (GSM2)). That is, the third RAT (GSM2) is the only radio access technology on the second subscriber identity module 518. Although the RATs allocated to different subscriber identity modules can be active (e.g., voice call and web browsing) at the same time, RATs on a same subscriber identity module cannot be active at the same time. For example, the first RAT on the first subscriber identity module 516 can be active at the same time as the third RAT on the second subscriber identity module 518. However, the first RAT and the second RAT on the first subscriber identity module 516 cannot be active at the same time.

As noted, a user equipment that incorporates multi SIM devices or a single SIM device may occasionally perform measurements of neighbor cells of one or more RATs. To perform the measurements, however, idle time slots are identified for the serving RAT. When the idle time slots are insufficient for the measurement, some uplink and/or downlink time slots carrying information (e.g., data) are dropped to create sufficient idle time slots for the measurements. For example, to handover a communication from the first RAT (e.g., TD-SCDMA/LTE/WCDMA) to the second RAT (GSM1) on a same or different receive chain, idle time slots of the first RAT are identified or created by dropping uplink and/or downlink information in some time slots of the first RAT. Dropping uplink and/or downlink information in some time slots of the first RAT to create the idle time slots (e.g., consecutive idle time slots) reduces the uplink and downlink throughput and degrades the quality of service of the communication system.

Inter Radio Access Technology Measurement with Multiple Receivers

Aspects of the present disclosure are directed to improving inter radio access technology (IRAT) measurements when valid measurement gaps or consecutive idle time slots are unavailable for the IRAT measurements. Such techniques may also be applied for inter-frequency (within the same RAT) and intra-frequency (within the same RAT) measurements. The aspects of the disclosure may be implemented in a user equipment (UE) with multiple receive chains and one or more subscriber identity modules when at least one of the subscriber identity modules are active and valid measurement gaps are unavailable.

In one aspect of the disclosure, the user equipment communicates with a first receive (RX) chain for a first subscriber identity module (SIM). For example, the first subscriber identity module may be assigned to a first operator for communication according to a first RAT (e.g., TD-SCDMA). The user equipment then performs the inter radio access technology measurement with a second receive chain while maintaining communications with the first receive chain and corresponding first subscriber identity module. Thus, when the UE recognizes that valid measurement gaps or consecutive idle time slots are unavailable during active communication (e.g., voice call) over the first receive chain according to the first RAT, the UE performs the IRAT measurement of a second RAT/frequency (e.g., GSM) on the second receive chain. In one aspect of the disclosure, communication on the second receive chain may be inactive during the IRAT measurement of the second RAT/frequency.

In one aspect of the disclosure, the second receive chain is assigned to a second subscriber identity module. The second subscriber identity module may be assigned to a second operator to communicate according to the second RAT. The second RAT may be the same as the first RAT but with a different frequency or may be different from the first RAT. For example, the second RAT may be LTE, TD-SCDMA, GSM, WCDMA or any other radio access technology. Similarly, the first RAT may be LTE, TD-SCDMA, GSM, WCDMA or any other radio access technology.

In another aspect of the disclosure, the second subscriber identity module is in an active mode (e.g., web browsing) while communications with the first subscriber identity module is also active (e.g., voice call). In this aspect, the IRAT measurement on the second receive chain assigned to the second subscriber identity module is performed when communications on the second subscriber identity module are lower priority than communications on the first subscriber identity module. For example, the priority of the communication is based on the radio access technology and/or the type of call (e.g., voice or data). The priority of the radio access technology may be indicated by a network. The indication may be based on the services offered by the radio access technology. For example, LTE may be allocated a higher priority for data communications. Similarly, GSM and TD-SCDMA may be assigned a higher priority for voice communications.

In yet another aspect of the disclosure, the second subscriber identity module is in standby mode. For example, the dual-SIM device (e.g., UE) may be a dual SIM-dual standby (DSDS) device, which means the UE is limited to connecting to one network at a time.

In one aspect of the disclosure, the user equipment performs radio access technology measurements of the serving and/or neighbor cells including intra frequency, inter frequency and/or inter radio access technology (RAT) measurements. For example, the UE may measure a current LTE serving cell/frequency and a target LTE cell. Similarly, the UE may measure a current LTE serving cell and a target time division-synchronous code division multiple access (TD-SCDMA) cell.

Aspects of the present disclosure improve radio access technology measurements for the serving RAT by performing the measurements on a second receive when consecutive time slots for the IRAT measurements are unavailable to the serving RAT. Performing the measurements on the second receive chain reduces call drops, improves uplink and downlink throughput and enhances the communication service quality.

Figure 6:
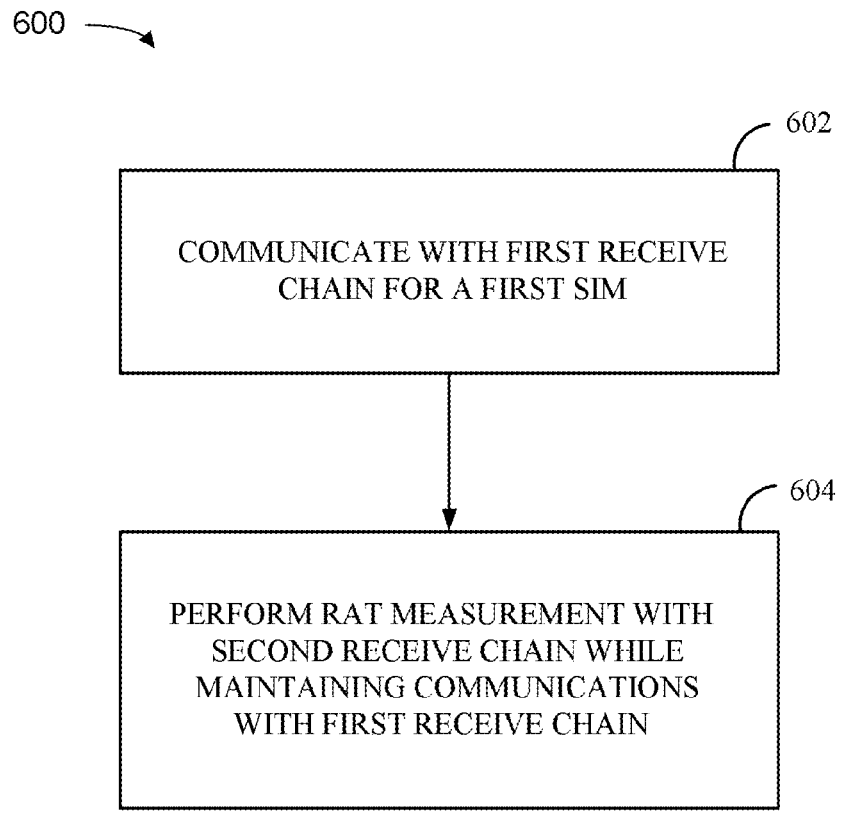
FIG. 6 is a flow diagram illustrating a method for wireless communication according to one aspect of the present disclosure.

FIG. 6 shows a wireless communication method 600 according to one aspect of the disclosure. A UE communicates with a first receive (RX) chain for a first subscriber identity module (SIM), as shown in block 602. The UE also performs radio access technology (RAT) measurement with a second receive (RX) chain while maintaining communications with the first receive chain, as shown in block 604.

Figure 7:
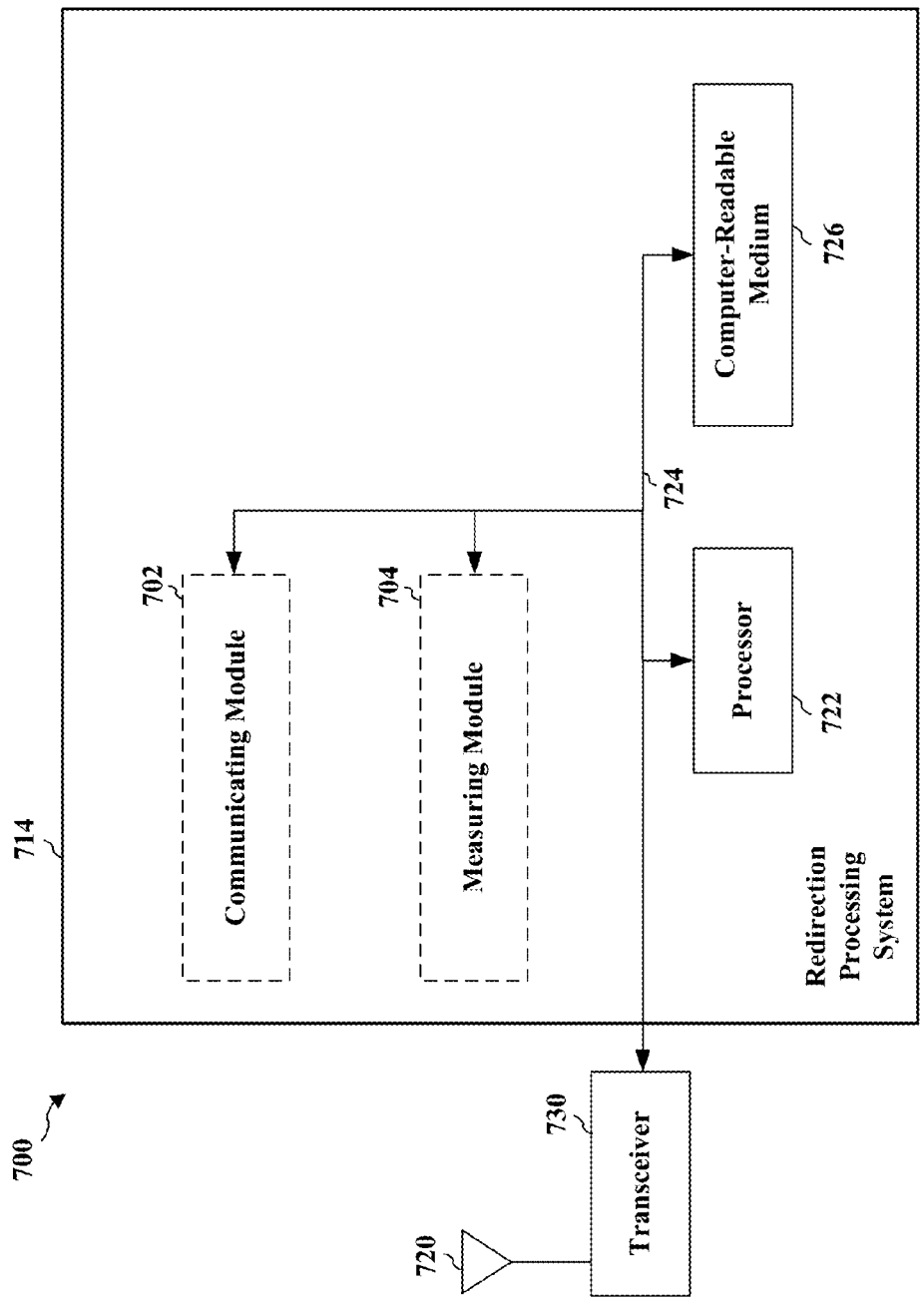
FIG. 7 is a diagram illustrating an example of a hardware implementation for an apparatus employing a processing system according to one aspect of the present disclosure.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722 the modules 702, 704 and the non-transitory computer-readable medium 726. The bus 724 may also link various other circuits such as timing sources, peripherals, voltage regulators, and power management circuits, which are well known in the art, and therefore, will not be described any further.

The apparatus includes a processing system 714 coupled to a transceiver 730. The transceiver 730 is coupled to one or more antennas 720. The transceiver 730 enables communicating with various other apparatuses over a transmission medium. The processing system 714 includes a processor 722 coupled to a non-transitory computer-readable medium 726. The processor 722 is responsible for general processing, including the execution of software stored on the computer-readable medium 726. The software, when executed by the processor 722, causes the processing system 714 to perform the various functions described for any particular apparatus. The computer-readable medium 726 may also be used for storing data that is manipulated by the processor 722 when executing software.

The processing system 714 includes a communicating module 702 for communicating with a first receive (RX) chain for a first subscriber identity module (SIM). The processing system 714 also includes a measuring module 704 for performing radio access technology (RAT) measurement with a second receive (RX) chain while maintaining communications with the first receive chain. The modules may be software modules running in the processor 722, resident/stored in the computer-readable medium 726, one or more hardware modules coupled to the processor 722, or some combination thereof. The processing system 714 may be a component of the UE 350 and may include the memory 392, and/or the controller/processor 390.

In one configuration, an apparatus such as a UE, is configured for wireless communication including means for communicating. In one aspect, the communicating means may be the antennas 352/720, the receiver 354, the transmitter 356, the transceiver 730, the channel processor 394, the receive frame processor 360, the receive processor 370, transmit frame processor 382, the transmit processor 380, the controller/processor 390, the memory 392, the radio access technology measurement module 391, the communicating module 702, and/or the processing system 714 configured to perform the aforementioned means. The UE is also configured to include means for performing measurement. In one aspect, the measurement performing means may be the antennas 352/720, the receiver 354, the transceiver 730, the channel processor 394, the receive frame processor 360, the receive processor 370, the controller/processor 390, the memory 392, the radio access technology measurement module 391, the measuring module 704 and/or the processing system 714 configured to perform the aforementioned means. In one configuration, the means functions correspond to the aforementioned structures. In another aspect, the aforementioned means may be a module or any apparatus configured to perform the functions recited by the aforementioned means.

Additionally, an apparatus such as a UE, is configured for wireless communications and may include a means for assigning the second receive chain to a second subscriber identity module. In one aspect, the assigning means may be the controller/processor 390, the memory 392, the radio access technology measurement module 391, the measuring module 704 and/or the processing system 714 configured to perform the aforementioned means. In one configuration, the means functions correspond to the aforementioned structures. In another aspect, the aforementioned means may be a module or any apparatus configured to perform the functions recited by the aforementioned means.

Several aspects of a telecommunications system have been presented with reference to LTE, TD-SCDMA, WCDMA, 1× radio transmission technology (1×), global navigation satellite system (GNSS), Evolution-Data Optimized (EV-DO) and GSM systems. As those skilled in the art will readily appreciate, various aspects described throughout this disclosure may be extended to other telecommunication systems, network architectures and communication standards. By way of example, various aspects may be extended to other UMTS systems such as W-CDMA, high speed downlink packet access (HSDPA), high speed uplink packet access (HSUPA), high speed packet access plus (HSPA+) and TD-CDMA. Various aspects may also be extended to systems employing long term evolution (LTE) (in FDD, TDD, or both modes), LTE-Advanced (LTE-A) (in FDD, TDD, or both modes), CDMA2000, evolution-data optimized (EV-DO), ultra mobile broadband (UMB), IEEE 802.11 (Wi-Fi), IEEE 802.16 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication with a multi receive chain user equipment (UE), comprising:
   communicating with a first receive (RX) chain for a first subscriber identity module (SIM);
   determining whether consecutive idle time slots or valid measurement gaps are unavailable during the communicating with the first RX chain; and
   performing radio access technology (RAT) measurement with a second receive (RX) chain while maintaining communications with the first RX chain when the consecutive idle time slots or valid measurement gaps are unavailable.

2. The method of claim 1, in which the second receive chain is assigned to a second subscriber identity module.

3. The method of claim 2, in which the second subscriber identity module is in active mode, and communications on the second subscriber identity module are lower priority than communications on the first subscriber identity module.

4. The method of claim 2, in which the second subscriber identity module is in standby mode.

5. The method of claim 1, in which the measurement comprises intra frequency, inter frequency and/or inter radio access technology measurements.

6. An apparatus for wireless communication with a multi receive chain user equipment (UE), comprising:
   means for communicating with a first receive (RX) chain for a first subscriber identity module (SIM);
   means for determining whether consecutive idle time slots or valid measurement gaps are unavailable during the communicating with the first RX chain; and
   means for performing radio access technology (RAT) measurement with a second receive (RX) chain while maintaining communications with the first RX chain when the consecutive idle time slots or valid measurement gaps are unavailable.

7. The apparatus of claim 6, means for assigning the second receive chain to a second subscriber identity module.

8. The apparatus of claim 7, in which the second subscriber identity module is in active mode, and communications on the second subscriber identity module are lower priority than communications on the first subscriber identity module.

9. The apparatus of claim 7, in which the second subscriber identity module is in standby mode.

10. The apparatus of claim 6, in which the measurement comprises intra frequency, inter frequency and/or inter radio access technology measurements.

11. An apparatus for wireless communication with a multi receive chain user equipment (UE), comprising:
   a memory; and
   at least one processor coupled to the memory and configured:
      to communicate with a first receive (RX) chain for a first subscriber identity module (SIM);
      to determine whether consecutive idle time slots or valid measurement gaps are unavailable during the communicating with the first RX chain; and
      to perform radio access technology (RAT) measurement with a second receive (RX) chain while maintaining communications with the first RX chain when the consecutive idle time slots or valid measurement gaps are unavailable.

12. The apparatus of claim 11, in which the at least one processor is further configured to assign the second receive chain to a second subscriber identity module.

13. The apparatus of claim 12, in which the second subscriber identity module is in active mode, and communications on the second subscriber identity module are lower priority than communications on the first subscriber identity module.

14. The apparatus of claim 12, in which the second subscriber identity module is in standby mode.

15. The apparatus of claim 11, in which the measurement comprises intra frequency, inter frequency and/or inter radio access technology measurements.

16. A non-transitory computer-readable medium having program code recorded thereon, the program code comprising:
   program code to communicate with a first receive (RX) chain for a first subscriber identity module (SIM);
   program code to determine whether consecutive idle time slots or valid measurement gaps are unavailable during the communicating with the first RX chain; and
   program code to perform radio access technology (RAT) measurement with a second receive (RX) chain while maintaining communications with the first RX chain when the consecutive idle time slots or valid measurement gaps are unavailable.

17. The non-transitory computer-readable medium of claim 16, further comprising program code to assign the second receive chain to a second subscriber identity module.

18. The non-transitory computer-readable medium of claim 17, in which the second subscriber identity module is in active mode, and communications on the second subscriber identity module are lower priority than communications on the first subscriber identity module.

19. The non-transitory computer-readable medium of claim 17, in which the second subscriber identity module is in standby mode.

20. The non-transitory computer-readable medium of claim 16, in which the measurement comprises intra frequency, inter frequency and/or inter radio access technology measurements.

* * * * *